C. H. FALLS.
ANIMAL TRAP.
APPLICATION FILED MAR. 15, 1911.
1,003,891.
Patented Sept. 19, 1911.
3 SHEETS—SHEET 1.
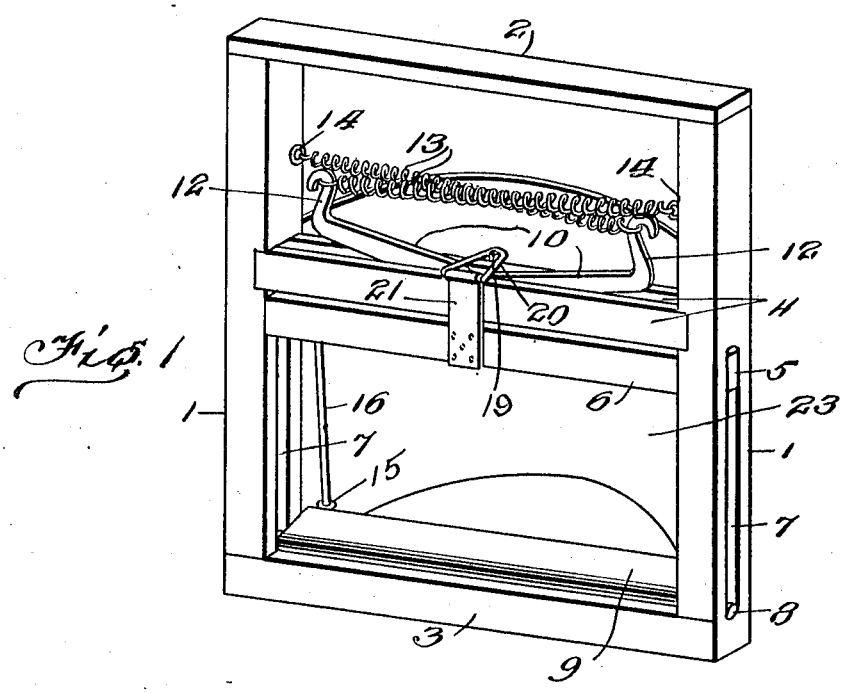
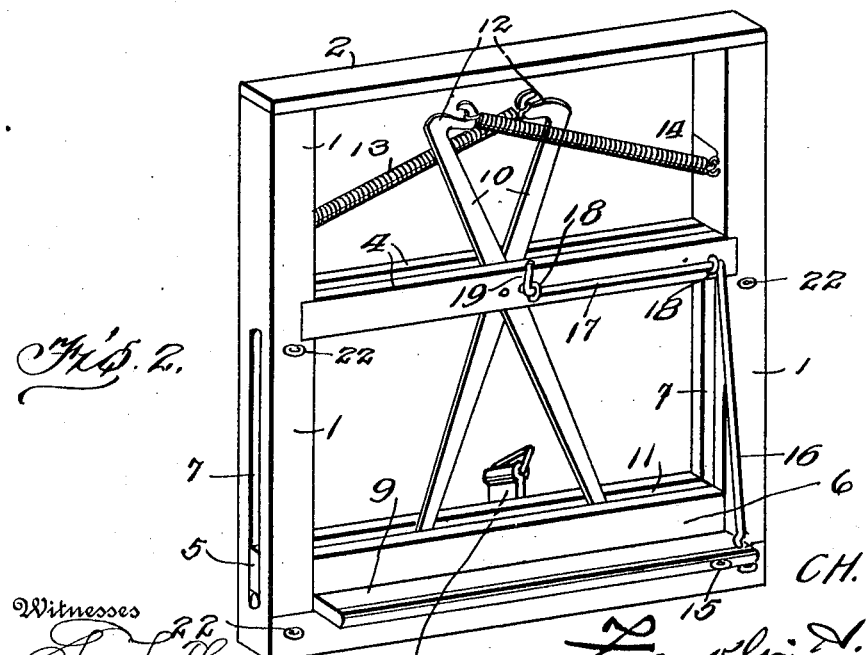

C. H. FALLS.
ANIMAL TRAP.
APPLICATION FILED MAR. 15, 1911.
1,003,891.
Patented Sept. 19, 1911.
3 SHEETS—SHEET 2.
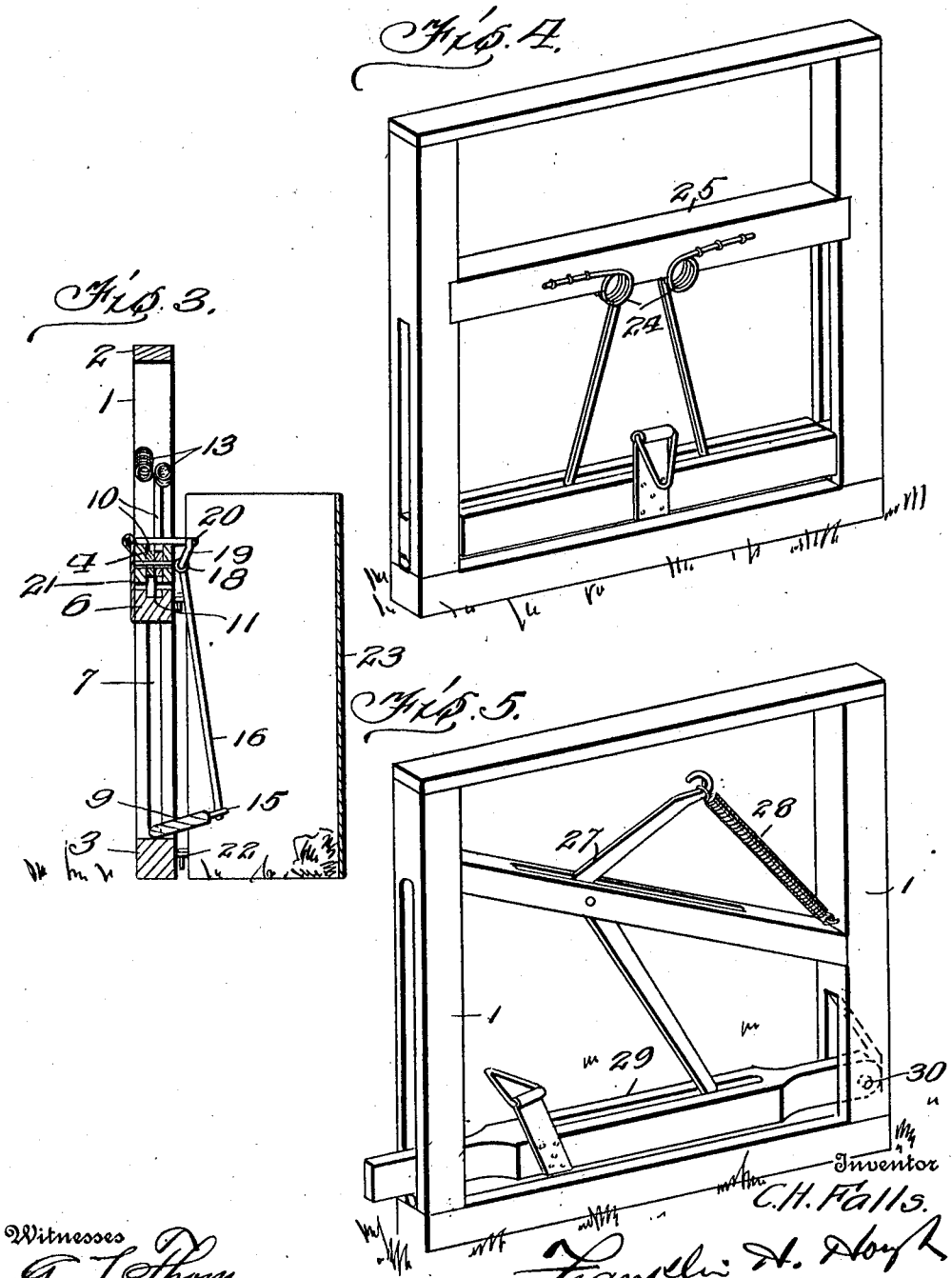

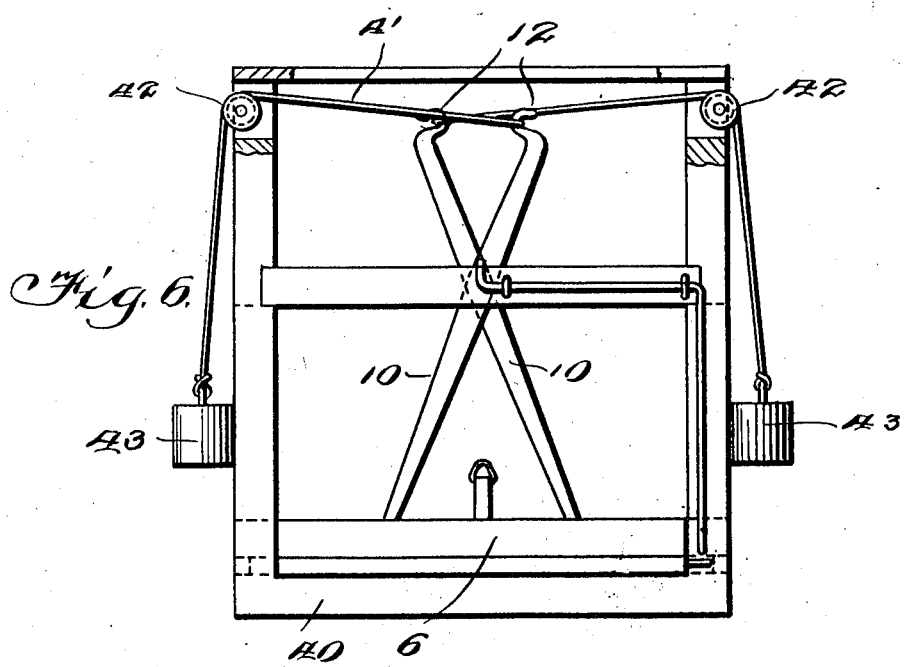
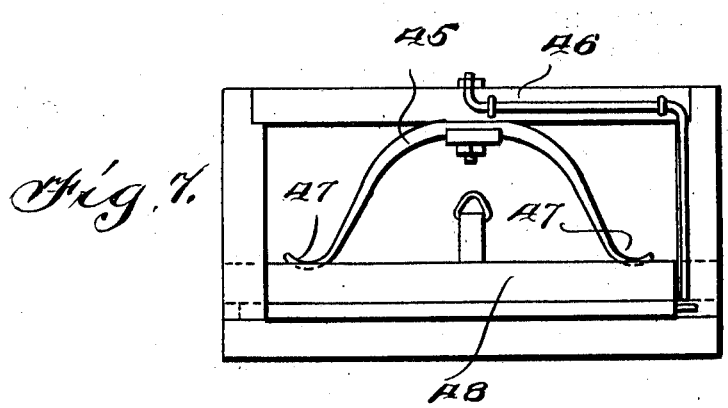

UNITED STATES PATENT OFFICE.

CHARLES H. FALLS, OF NASHUA, IOWA.

ANIMAL-TRAP.

1,003,891.  Specification of Letters Patent.  Patented Sept. 19, 1911.

Application filed March 15, 1911. Serial No. 614,743.

*To all whom it may concern:*

Be it known that I, CHARLES H. FALLS, a citizen of the United States, residing at Nashua, in the county of Chickasaw and State of Iowa, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to animal traps and more particularly to spring-actuated, dead fall types and has for its object to provide a simple and positive means of operating the vertically movable trap bar.

Further objects will be apparent from the following specification, appended claims and drawings thereof, in which:—

Figure 1 is a perspective view of the trap showing the same set and ready for manipulation. Fig. 2 is a similar view from the rear with the bait inclosure removed and the trap sprung. Fig. 3 is a vertical sectional view through the trap. Fig. 4 is a perspective view of a modified form of actuating mechanism. Fig. 5 is a similar view of another form. Fig. 6 is a slight modification of my invention in which weights are substituted for springs, and Fig. 7 is a detail view showing a still different modification.

Referring more specifically to the drawings, 1 indicates the vertical standards, 2 the top cross-piece and 3 the bottom cross-piece of a frame, having parallel bars 4 connecting the standards 1 slightly above the middle thereof. The standards 1 are slotted below the cross-pieces as at 7 to receive the lugs 5 extending from a vertically movable drop bar 6, said grooves guiding the drop bar 6 in its movement and also preventing the misplacement of said bar by an animal after being trapped. Pivoted in the lower ends of the slots 7 by the trunnions 8 is a tripping board 9, said board lying flat upon the lower cross-piece 3 when the trap is sprung and in an oblique relation to said cross-piece when the trap is set.

Pivotally mounted between the parallel bars 4 at about the middle thereof are the levers 10, one end of each of which bears in a groove 11 in the top of the drop bar 6 and the opposite end of each is hooked as at 12 to receive one end of a coiled spring 13, the opposite end of which is secured to the vertical standards 1 by an eye bolt 14, said springs 13 being in tension at all times.

The rear edge of the tripping board is provided with an eye 15 intended to receive the depending arm 16 of a trigger or latch releasing member 17, said trigger being pivoted in screw eyes 18 on the rear side of the cross bar 4. The trigger 17 has the end bent at right angles thereto as at 19, which is arranged to engage a ring 20 on the upstanding bracket 21 which is secured to the drop bar.

Supported by the screw eyes 22 which are in the vertical standards 1 is a housing or yard 23, which yard is intended to protect the bait except from through the trap.

In the modified form shown in Fig. 4, springs 24 are secured to the cross-piece 25, said springs being of the coiled type, one end of each of the coils being secured to the cross-piece while the opposite end is arranged to bear in a groove in the drop bar.

In Fig. 5 of the drawings, the crosspiece is diagonal and only one lever 27 of the bell crank type is used, one end of which is hooked to receive one end of the spring 28, the opposite end of which is hooked to the standard 1 and the opposite end of the lever 27 is arranged to bear in a groove in the drop bar 29, which bar is fulcrumed at one end as at 30 and the free end of which is guided in the slot formed in the standard 1. The latch and releasing devices of Figs. 4 and 5 are similar to Figs. 1, 2 and 3.

In Fig. 6 of the drawings, I have shown a slight modification of the invention in which the springs are dispensed with and weights substituted therefor and in which the frame 40 is provided with the usual drop bar 6 and the levers 10 have their upper ends bent to form hooks 12 and ropes or cords 41 are fastened one to each hook 12 and each passes over a pulley 42 journaled upon the frame and has a weight 43 secured to its end and adapted to throw the opposite ends of the levers together to produce the same effect caused by the springs and as illustrated in Figs. 1 and 2.

In Fig. 7 of the drawings, I have substituted a semi-elliptical spring 45 which is fastened to the frame 46 and the curved ends 47 of the spring bear against the drop bar 48.

From the foregoing, the operation of the trap is obvious. The levers are moved, allowing the drop bar to be raised, the ring secured to the bracket on said drop bar passed over the crosspiece and caught over the tripper, the depending arm of which is inserted in the screw eye on the tripping board, the bait then being placed in the yard. When the animal reaches through the opening between the drop bar and tripping board for the bait, the weight of his forefeet on the tripping board releases the trigger which in turn releases the ring allowing the drop bar to fall and catch the animal.

Having thus fully described my invention, what I claim to be new and desire to secure by Letters Patent is:—

1. An animal trap comprising a frame, a crosspiece in said frame, spring-actuated levers pivoted to said crosspiece, a trigger pivoted to said crosspiece, a tripping board pivoted in said frame, an eye in said tripping board, a depending arm from said trigger engageable with the eye in said tripping board, a drop bar slidable vertically in said frame, a ring carried by said drop bar to receive the trigger, said spring-actuated levers bearing on said cross bar, and a housing secured to said frame and designed to prevent entrance to the trap from one side.

2. An animal trap comprising a frame of vertically slotted standards, crosspieces connecting said standards, a lever pivoted to one of said crosspieces, springs secured to said levers and said frame, a drop bar slidable vertically in said standards, said levers bearing on said drop bar, a depressible trigger releasing board pivoted in said frame, and a trigger governed by said releasing board to control the operation of said drop bar.

In testimony whereof I hereunto affix my signature in the presence of two witnesses.

CHARLES H. FALLS.

Witnesses:
J. A. YARGER,
P. F. WENTWORTH.

---

Copies of this patent may be obtained for five cents each, by addressing the "Commissioner of Patents, Washington, D. C."